United States Patent
Dallal et al.

(10) Patent No.: US 11,342,976 B1
(45) Date of Patent: May 24, 2022

(54) ORBITAL ANGULAR MOMENTUM (OAM) ANTENNA FOR GENERATING OAM BEAMS

(71) Applicant: QUALCOMM Incorporated, San Diego, CA (US)

(72) Inventors: Yehonatan Dallal, Kfar Saba (IL); Shay Landis, Hod Hasharon (IL); Ran Berliner, Kfar-Aviv (IL); Idan Michael Horn, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/225,035

(22) Filed: Apr. 7, 2021

(51) Int. Cl.
*H04B 7/06* (2006.01)
*H01Q 3/36* (2006.01)

(52) U.S. Cl.
CPC ............. *H04B 7/0617* (2013.01); *H01Q 3/36* (2013.01)

(58) Field of Classification Search
CPC ................................ H04B 7/0617; H01Q 3/36
USPC ........................................................ 375/267
See application file for complete search history.

(56) References Cited

U.S. PATENT DOCUMENTS 8,988,754 B2 * 3/2015 Sun ..................... G02B 6/12033
359/238
10,511,092 B2 * 12/2019 Sajuyigbe .............. H01Q 21/28

OTHER PUBLICATIONS

F. Qin, L. Li, Y. Liu, W. Cheng and H. Zhang, "A Four-Mode OAM Antenna Array With Equal Divergence Angle," in IEEE Antennas and Wireless Propagation Letters, vol. 18, No. 9, pp. 1941-1945, Sep. 2019.*

* cited by examiner

*Primary Examiner* — Fitwi Y Hailegiorgis
(74) *Attorney, Agent, or Firm* — Seyfarth Shaw LLP

(57) ABSTRACT

This disclosure presents an orbital angular momentum (OAM) antenna that includes a plurality of concentric antenna arrays, each antenna array corresponding to a different respective OAM order and being comprised of a different respective set of antenna elements arranged at a different respective radius. The OAM antenna also includes a plurality of phase shifters, each phase shifter corresponding to a different respective antenna array of the plurality of concentric antenna arrays. Each phase shifter is configured to trigger the respective set of antenna elements of a corresponding antenna array to generate a respective OAM beam. According to aspects of the disclosure, each OAM beam generated by a respective antenna array has a same divergence angle as the other OAM beams generated by the other respective antenna arrays of the plurality of concentric antenna arrays.

21 Claims, 9 Drawing Sheets

ORBITAL ANGULAR MOMENTUM (OAM) ANTENNA FOR GENERATING OAM BEAMS

FIELD OF THE DISCLOSURE

This disclosure relates generally to wireless communication, and specifically, to an orbital angular momentum (OAM) antenna and techniques for transmitting OAM beams via the OAM antenna.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

An orbital angular momentum (OAM) beam is a type of orthogonal beam generated by an antenna array. The OAM beam may correspond to an OAM order that defines a number of times a phase of the OAM beam rotates around a beam axis. The OAM order may be characterized as a positive or negative integer m. In some examples, when an absolute value of the OAM order is greater than zero, the corresponding OAM beam has a singularity (for example, a low-intensity region) at the center of the OAM beam. In some examples, a helical phase front associated with an OAM beam may be generated by triggering elements of an antenna array based on linear phase precoding, such as digital precoding, an active phase shifter, or a Butler matrix.

SUMMARY

In one aspect of the present disclosure, an orbital angular momentum (OAM) antenna includes multiple concentric antenna arrays, each antenna array corresponding to a different respective OAM order and being comprised of a different respective set of antenna elements arranged at a different respective radius. The OAM antenna also includes multiple phase shifters, each phase shifter corresponding to a different respective antenna array of the concentric antenna arrays. Each phase shifter is configured to trigger the respective set of antenna elements of a corresponding antenna array to generate a respective OAM beam. According to aspects of the disclosure, each OAM beam generated by a respective antenna array has a same divergence angle as the other OAM beams generated by the other respective antenna arrays of the plurality of concentric antenna arrays.

Another aspect of the present disclosure is directed to a network device including an OAM antenna. The OAM antenna includes multiple concentric antenna arrays, each of the antenna arrays corresponding to a different OAM order and being comprised of a different respective set of antenna elements arranged at a different respective radius; and multiple phase shifters, each of the phase shifters corresponding to a different respective antenna array of the plurality of concentric antenna arrays and configured to trigger the respective set of antenna elements of the corresponding antenna array to generate a respective OAM beam, each of the OAM beams generated from the concentric antenna arrays having a same divergence angle. The network device also includes a processor. The network device further includes a memory communicatively coupled with the processor. The memory may store instructions that, when executed by the processor, cause the network device to transmit a signal via the OAM beams.

In another aspect of the present disclosure, a method for wireless communication performed by an OAM antenna includes receiving, from a data source, a signal at multiple concentric antenna arrays of the OAM antenna, each of the antenna arrays corresponding to a different OAM order and being comprised of a different respective set of antenna elements arranged at a different respective radius. The method also includes controlling a timing of the different respective set of antenna elements. The method further includes transmitting the signal via an OAM beam generated from each of the antenna arrays based on the controlled timing, each of the OAM beams generated from the concentric antenna arrays having a same divergence angle.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
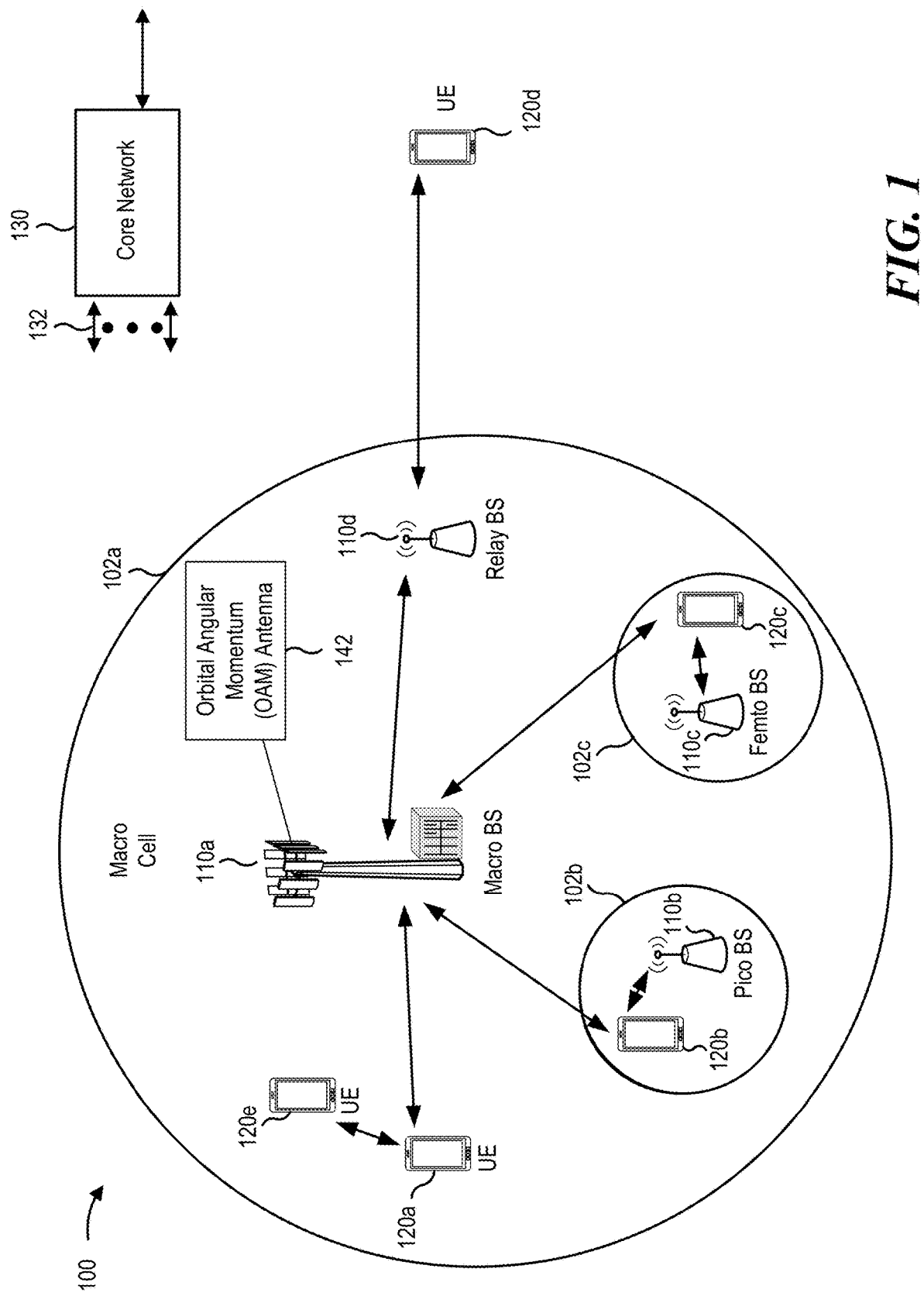
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

An orbital angular momentum (OAM) beam is a type of orthogonal beam generated by an antenna array. The OAM beam may correspond to an OAM order that defines a number of times a phase of the OAM beam rotates around a beam axis. The OAM order may be characterized as a positive or negative integer m. In some examples, when an absolute value of the OAM order is greater than zero, the corresponding OAM beam has a singularity (for example, a low-intensity region) at the center of the OAM beam. In some examples, a helical phase front associated with an OAM beam may be generated by triggering elements of an antenna array based on linear phase precoding. For example, digital precoding, an active phase shifter, or a Butler matrix may be used to generate an OAM beam by triggering elements of a singular antenna array. In some examples, the phase shifter may be a traveling wave feed or a per-element phase shifter with delay lines. Because conventional OAM antennas may be limited to a single circular antenna array corresponding to an OAM order, OAM beams generated from different respective OAM antennas may diverge at different angles. An OAM receiver compares the phases around the singularity to detect the OAM order. Therefore, it may be difficult for the OAM receiver to receive different OAM beams generated from different respective conventional OAM antennas when different OAM beams diverge at different angles. It may be desirable to radiate each OAM beam at a same divergence angle regardless of the corresponding OAM order.

Various implementations relate generally to an OAM antenna for generating OAM beams. Some implementations more specifically relate to an OAM antenna having two or more concentric antenna arrays. In such implementations, each respective antenna array of the two or more concentric antenna arrays has a different set of antenna elements and a different radius. In some examples, each concentric antenna array of the two or more concentric antenna arrays is a uniform circular phased antenna array. In such implementations, each respective antenna array of the two or more concentric antenna arrays corresponds to a different OAM order. In some examples, the OAM order defines a number of times a phase of the respective OAM beam rotates around a central axis. Furthermore, a number of elements in the set of antenna elements of each respective antenna array may be based on the OAM order corresponding to the respective antenna array. In some such examples, the number of elements may be greater than twice an absolute value of the OAM order.

Additionally, in some implementations, the OAM antenna also includes two or more phase shifters, each respective phase shifter corresponding to a different respective antenna array of the two or more concentric antenna arrays. In some examples, each phase shifter is hard-wired. Each respective phase shifter may be configured to trigger the set of antenna elements of a corresponding antenna array to generate an OAM beam, such that each OAM beam generated from a respective antenna array has a same divergence angle as other OAM beams generated from other respective antenna arrays of the concentric antenna arrays associated with different OAM orders. In some examples, the divergence angle of each respective OAM beam may be based on the radius of the antenna array generating the respective OAM beam, the OAM order corresponding to the antenna array generating the respective OAM beam, and a wavelength of the respective OAM beam.

Particular implementations of the subject matter described in this disclosure can be implemented to realize one or more of the following potential advantages. In some examples, each OAM beam generated by the OAM antenna may be radiated with the same divergence angle regardless of a corresponding OAM order. By maintaining a same divergence angle for each different OAM beam generated from the OAM antenna, some aspects of the present disclosure may reduce a complexity in receiving different OAM beams at an OAM receiver. In some other examples, by generating each OAM beam from a different respective antenna array of the two or more concentric antenna arrays, aspects of the present disclosure may reduce costs by mitigating a need for implementing a configurable phased array. Additionally, the OAM antenna may be expandable by adding additional concentric antenna arrays. Finally, aspects of the present disclosure may reduce a total number of antenna elements in each antenna array by specifying a function for determining a minimum number of antenna elements for generating an OAM beam from each respective antenna array. For example, one or more antenna elements may be removed from an antenna array if the number of antenna elements in the antenna array is greater than the minimum number of antenna elements determined for the particular antenna array.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The base station 110*a* may include an OAM antenna 142. For brevity, only one base station 110*a* is shown as including the OAM antenna 142. The OAM antenna 142 may include a number of concentric antenna arrays. In some implementations, each respective antenna array may include a different set of antenna elements and a different radius. In such implementations, each respective antenna array corresponds to a different OAM order. Additionally, the OAM antenna 142 may include a number of phase shifters (not shown). In some implementations, each respective phase shifter of the number of phase shifters corresponds to a different respective antenna array of the number of concentric antenna arrays. In such implementations, each respective phase shifter may be configured to trigger the set of antenna elements of a corresponding antenna array to generate a different respective OAM beam of the number of OAM beams. Furthermore, in such implementations, the OAM beams have a same divergence angle.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, or may be implemented as narrowband internet of things (NB-IoT) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
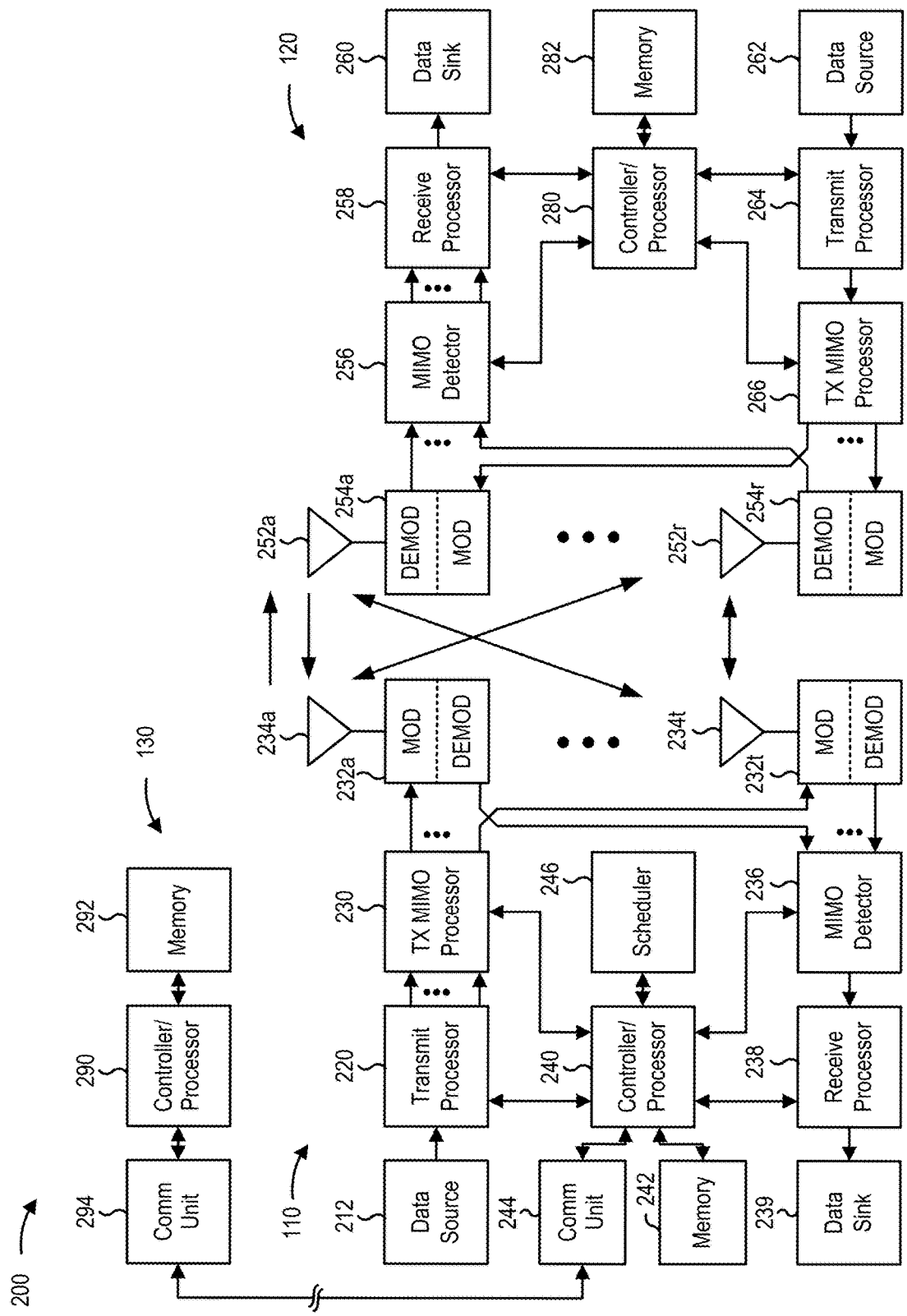
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with transmitting an OAM beam via an OAM antenna including a number of concentric antenna array as described in more detail elsewhere. For example, the controller/processor 240 of the base station 110, the controller/processor 280 of the UE 120, and/or any other component(s) of FIG. 2 may perform or direct operations of, for example, the process of FIG. 8 or other processes as described. Memories 242 and 282 may store data and program codes for the base station 110 and UE 120, respectively. A scheduler 246 may schedule UEs for data transmission on the downlink and/or uplink.

Figure 3A:
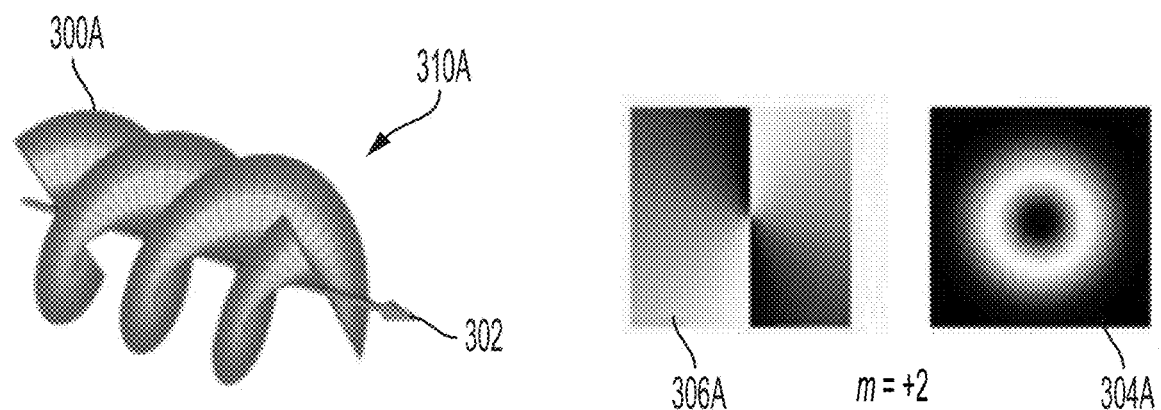
FIGS. 3A, 3B, 3C, 3D, and 3E are diagrams illustrating examples of helical structures of orbital angular momentum (OAM) beams corresponding to an OAM order.

As described above, OAM beams are a set of orthogonal beams generated by an antenna array. In some examples, OAM beams may be used for a line-of-sight (LoS) multiple-input multiple-output (MIMO) system. FIG. 3A illustrates an example of a helical structure 300A of an OAM beam 310A corresponding to an OAM order (m). In the example of FIG. 3A, the helical structure 300A corresponds to an OAM order having a value of positive two, which defines a number of times a phase of the OAM beam 310A rotates around a beam axis 302. Additionally, in the example of FIG. 3A, the phase of the OAM beam 310A rotates twice around the beam axis 302 because the OAM order has an absolute value of two. The sign (for example, positive or negative) of the OAM order may determine a direction (for example, clockwise or counter-clockwise) of the rotation around the beam axis 302. The OAM beam 310A may also correspond to a phase front 306A and an intensity distribution 304A based on the corresponding OAM order. As shown in FIG. 3A, the intensity distribution 304A is ring-shaped, having a low-intensity region at the center of the ring. That is, in some examples, when an absolute value of the OAM order is greater than zero, the corresponding OAM beam 310A has a singularity (for example, a low-intensity region) at a center of the OAM beam.

Figure 3B:
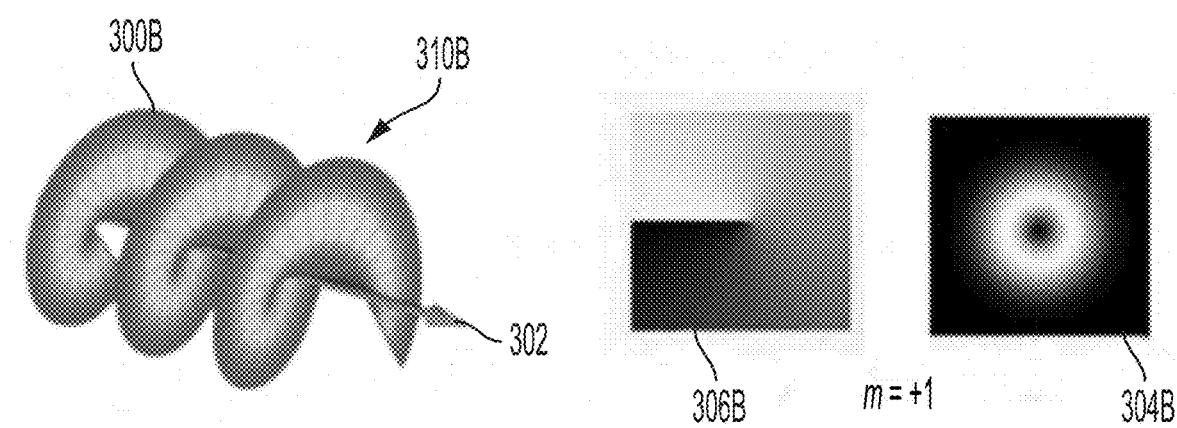

FIG. 3B illustrates an example of a helical structure 300B of an OAM beam 310B corresponding to an OAM order m. In the example of FIG. 3B, the helical structure 300B corresponds to an OAM order having a value of positive one, which defines a number of times a phase of the OAM beam 310B rotates around a beam axis 302. As shown in FIG. 3B, the phase of the OAM beam 310B rotates once around the beam axis 302 because the OAM order has an absolute value of one. The OAM beam 310B corresponds to a phase front 306B and an intensity distribution 304B based on the corresponding OAM order. As shown in FIG. 3B, the intensity distribution 304B of the OAM beam 310B is ring-shaped having a low-intensity region at the center of the ring based on an absolute value of the OAM order being greater than zero.

Figure 3C:
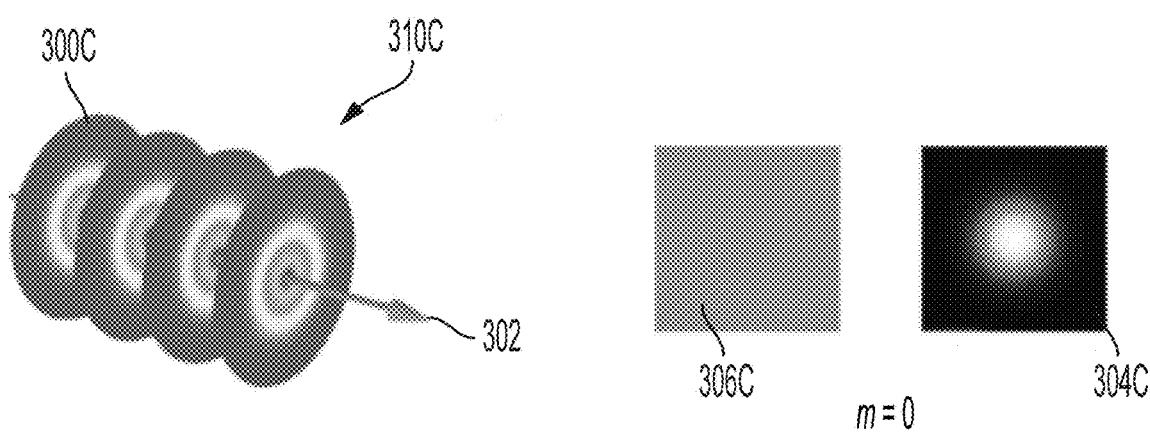

FIG. 3C illustrates an example of a helical structure 300C of an OAM beam 310C corresponding to an OAM order m. In the example of FIG. 3C, the helical structure 300C corresponds to an OAM order having a value of zero, which defines a number of times a phase of the OAM beam 310C rotates around a beam axis 302. As shown in FIG. 3C, the OAM beam 310C is planar and does not rotate around the beam axis 302 because the OAM order has a value of zero. The OAM beam 310C corresponds to a phase front 306C and an intensity distribution 304C based on the corresponding OAM order. As shown in FIG. 3C, the intensity distribution 304C is distinct from the ring-shaped intensity distributions 304A, 304B, 304D, and 304E, as described with respect to FIGS. 3A, 3B, 3D, and 3E, respectively.

Figure 3D:
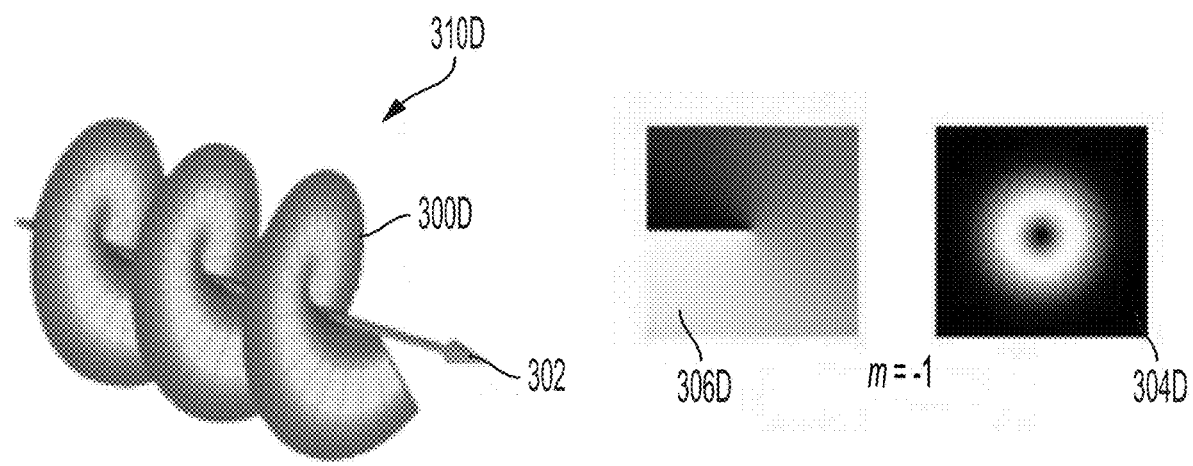

FIG. 3D illustrates an example of a helical structure 300D of an OAM beam 310D corresponding to an OAM order m. In the example of FIG. 3D, the helical structure 300D corresponds to an OAM order having a value of negative one, which defines a number of times a phase of the OAM beam 310D rotates around a beam axis 302. As shown in FIG. 3D, the phase of the OAM beam 310D rotates once around the beam axis 302 because the OAM order has an absolute value of one. The OAM beam 310D of FIG. 3D corresponds to a phase front 306D and an intensity distribution 304D based on the corresponding OAM order. As shown in FIG. 3D, the intensity distribution 304D is ring-shaped having a low-intensity region at the center of the ring based on an absolute value of the OAM order being greater than zero.

Figure 3E:
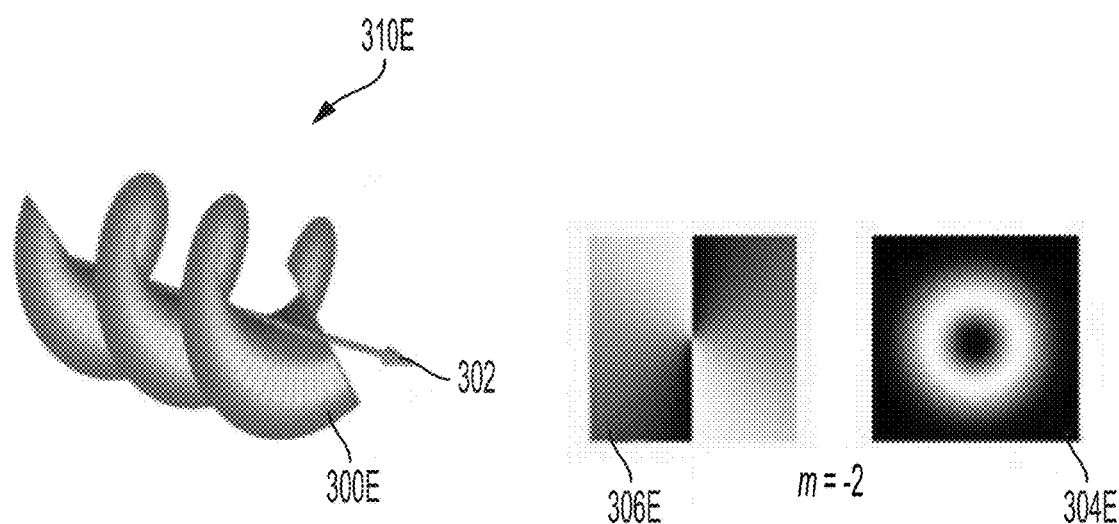

FIG. 3E illustrates an example of a helical structure 300E of an OAM beam 310E corresponding to an OAM order m. In the example of FIG. 3E, the helical structure 300E corresponds to an OAM order having a value of negative two, which defines a number of times a phase of the OAM beam 310E rotates around a beam axis 302. Additionally, in the example of FIG. 3E, the phase of the OAM beam 310E rotates once around the beam axis 302 because the OAM order has an absolute value of two. The OAM beam 310E corresponds to a phase front 306E and an intensity distribution 304E based on the corresponding OAM order. As shown in FIG. 3E, the intensity distribution 304E is ring-shaped having a low-intensity region at the center of the ring based on an absolute value of the OAM order being greater than zero.

As shown in FIGS. 3A, 3B, 3C, 3D, and 3E, a circular antenna array corresponding to a particular OAM order may generate a conical beam. As described, OAM beams generated from different respective OAM antennas may diverge at different angles. A divergence angle may be based on an OAM order m corresponding to a helical antenna array generating an OAM beam, a radius R of the helical antenna array, and a wavelength λ of the OAM beam. In some examples, two or more OAM beams may be generated from different circular antenna arrays, respectively. In such examples, each respective circular antenna array may have a different radius and may correspond to a different OAM order. As a result, each OAM beam may be generated with a different respective divergence angle, thus causing an intensity distribution of each respective OAM beam to have a different radius. For example, a radius of the intensity distribution 304E, as shown with respect to FIG. 3E, is different from a radius of the intensity distribution 304D, as shown with respect to FIG. 3D. The difference in respective radii may increase a dynamic range of OAM beams. As a result, an OAM receiver may fail to uniformly receive different OAM beams because some OAM beams may fall outside of the OAM receiver's reception range. In some examples, a complexity of a receiver may increase to account for the increased dynamic range of the OAM beams. Therefore, it may be desirable to equalize a divergence angle of different OAM beams to improve reception of the equalized OAM beams.

Figure 4:
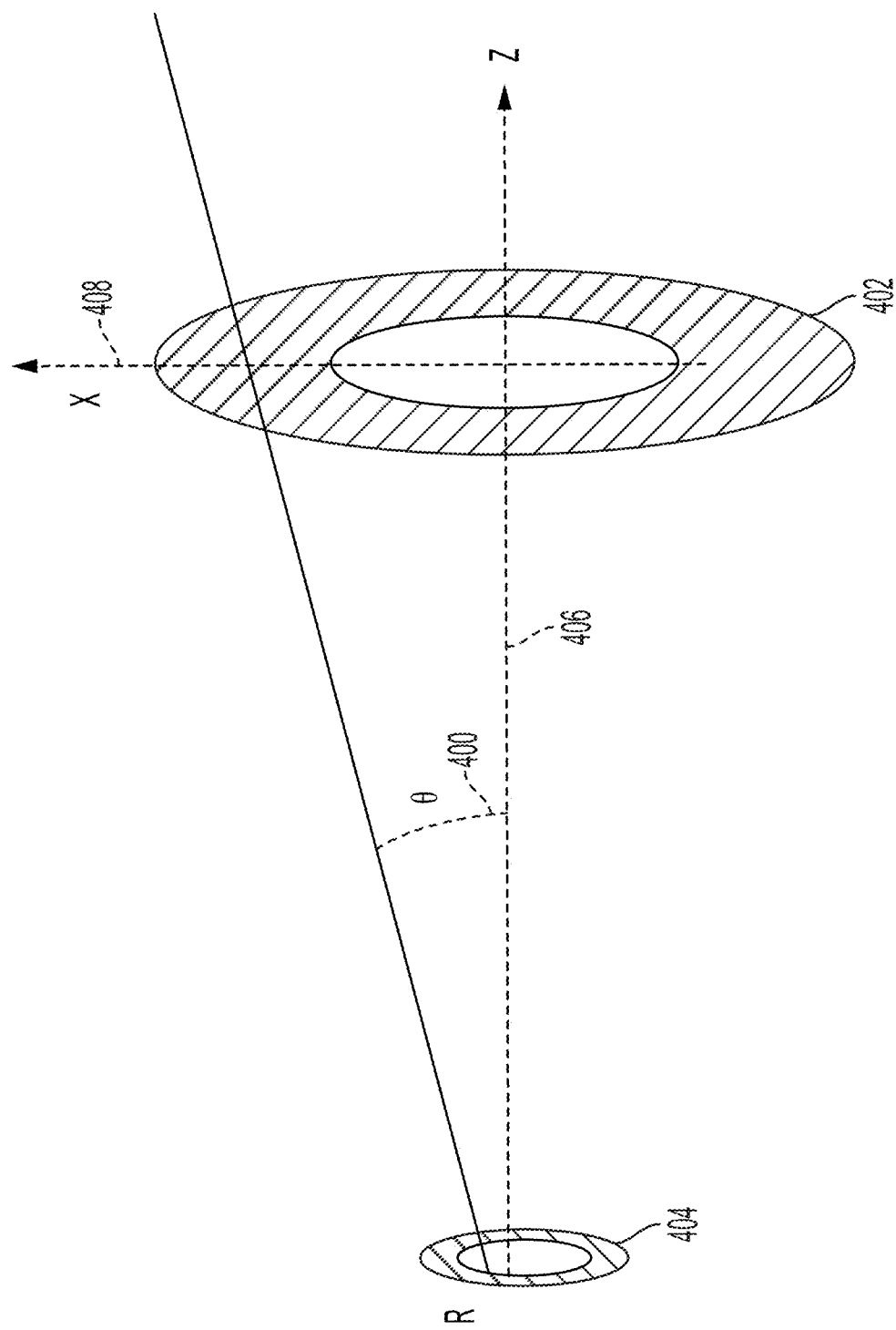
FIG. 4 is a diagram illustrating an example of a divergence angle of an OAM beam, in accordance with aspects of the present disclosure.

FIG. 4 is a diagram illustrating an example of a divergence angle 400 θ of an OAM beam 402, in accordance with aspects of the present disclosure. As shown in FIG. 4, an OAM beam 402 is generated from a circular antenna array 404 and radiates around a beam axis 406 z. Although not shown in FIG. 4, the OAM beam 402 may have a conical shape that expands along the x-axis 408 as the OAM beam 402 travels along the beam axis 406 z. In some implementations, the divergence angle 400 θ may be based on a radius R of the circular antenna array 404, a wavelength λ of the OAM beam 402, and the OAM order m. In such implementations, the divergence angle 400 θ may be determined based on the following equation:

$$\tan(\theta) = \frac{1}{2\pi}\frac{\lambda}{R}\beta_m, \quad (1)$$

where $\beta_m$ is a first maximum of a Bessel function such that $J_m(\beta_m) > J_m(x)$ corresponding to the OAM order m.

Some aspects of the present disclosure are directed to generating multiple OAM beams from concentric antenna arrays, in which each respective OAM beam of the multiple OAM beams has a same divergence angle as the other OAM beams of the multiple OAM beams. In such aspects, each respective OAM beam of the multiple OAM beams may be generated by a different respective antenna array of the concentric antenna arrays. In some implementations, each respective antenna array of the concentric antenna arrays corresponds to a different OAM order. In such implementations, a radius of each respective antenna array of the concentric antenna arrays may be set to obtain a same divergence angle for each respective OAM beam of the multiple OAM beams. In some such implementations, the radius may be determined as follows:

$$R_m = \frac{1}{2\pi}\frac{\lambda}{\tan(\theta)}\beta_m. \quad (2)$$

In Equation 2, a desired divergence angle θ may be determined for the multiple OAM beams. The radius $R_m$ for each antenna array may be determined based on a respective corresponding OAM order m and the desired divergence angle θ. That is, in some implementations, the desired divergence angle θ may be maintained while determining the radius $R_m$ for each antenna array of an OAM antenna.

Figure 5:
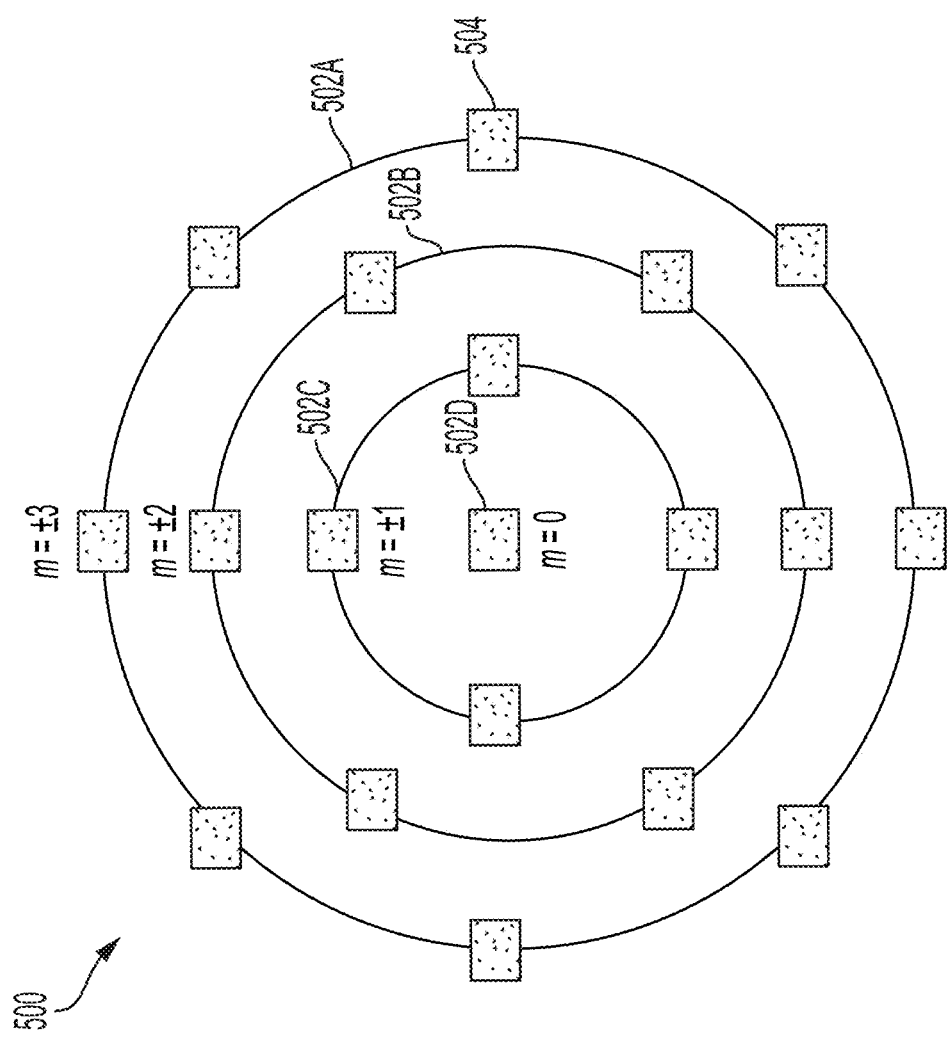
FIG. 5 is a diagram illustrating an example of an OAM antenna including multiple concentric antenna arrays, in accordance with aspects of the present disclosure.

FIG. 5 is a diagram illustrating an example of OAM antenna 500 including multiple concentric antenna arrays 502A, 502B, 502C, and 502D, in accordance with aspects of the present disclosure. In some implementations, each concentric antenna array 502A, 502B, 502C, and 502D may be a circular array. As shown in FIG. 5, each respective antenna array 502A, 502B, 502C, and 502D includes a different set of antenna elements 504 and a different radius. In some implementations, a number of antenna elements 504 in the set of antenna elements 504 of each respective antenna array 502A, 502B, 502C, and 502D may be based on the OAM order m corresponding to the respective antenna array. In some such implementations, the number of antenna elements 504 is greater than twice the absolute value of the OAM order m (for example, =2|m|+1).

Additionally, each respective antenna array corresponds to a different OAM order m. As described, the radius of each respective antenna array 502A, 502B, 502C, and 502D may be determined based on a desired divergence angle θ as described in Equation 2. In some implementations, the antenna arrays 502A, 502B, 502C, and 502D may be hard-wired. In some such implementations, the antenna arrays 502A, 502B, 502C, and 502D may be hard-wired on a printed circuit board (PCB).

In some implementations, the antenna arrays 502A, 502B, 502C, and 502D may be phased antenna arrays. In other implementations, a refractor may be defined behind the OAM antenna 500 to improve divergence angle equalization. Additionally, or alternatively, a detractor may be defined in front of the OAM antenna 500 to improve divergence angle equalization. Although not shown in the example of FIG. 5, in such implementations, the OAM antenna 500 may also include multiple phase shifters. In some implementations, each respective phase shifter of the multiple phase shifters corresponds to a different respective antenna array of the concentric antenna arrays 502A, 502B, 502C, and 502D. In such implementations, each respective phase shifter may be configured to trigger the set of antenna elements 504 of a corresponding antenna array 502A, 502B, 502C, and 502D to generate an OAM beam. Additionally, because a radius of each of the concentric antenna arrays 502A, 502B, 502C, and 502D is determined based on Equation 2, each OAM beam generated from a respective antenna array has a same divergence angle as other OAM beams generated from other respective antenna arrays of the concentric antenna arrays 502A, 502B, 502C, and 502D. In some implementations, each respective concentric antenna array 502A, 502B, 502C, and 502D generates a separate OAM beam. In some such implementations, the separate OAM beams may be generated at a same time. Aspects of the present disclosure are not limited to the number of antenna arrays shown in the example of FIG. 5. A number of concentric antenna arrays of the OAM antenna 500 may increase or decrease based on a desired implementation. Additionally, a number of elements 504 for each respective antenna array 502A, 502B, 502C, and 502D may increase or decrease as long as the number of elements is greater than twice an absolute value of a corresponding OAM order m.

Figure 6:
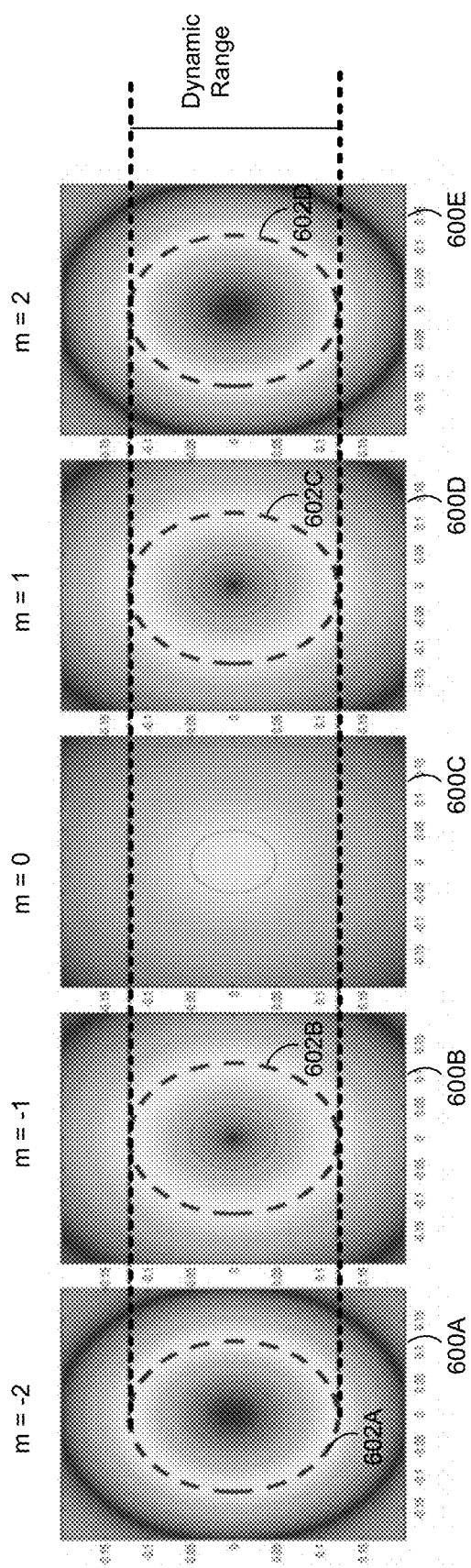
FIG. 6 is a diagram illustrating examples of intensity distributions for respective generalized OAM beams, in accordance with aspects of the present disclosure.

As described, according to aspects of the present disclosure, each OAM beam generated from a respective antenna array of multiple antenna arrays of an OAM antenna has a same divergence angle. Therefore, in some implementations, the OAM beams generated by the OAM antenna may be generalized. FIG. 6 is a diagram illustrating an example of intensity distributions 600A, 600B, 600C, 600D, and 600E for respective generalized OAM beams, in accordance with aspects of the present disclosure. In the examples of FIG. 6, the respective intensity distributions 600A, 600B, 600C, 600D, and 600E may have a same divergence angle, which is in contrast to conventional OAM beams where each respective OAM beam diverges at a different angle. Therefore, the respective intensity distributions 600A, 600B, 600C, 600D, and 600E may have a substantially uniform radii 602A, 602B, 602C, 602D, which may decrease a dynamic range of corresponding OAM beams. That is, a power of each respective OAM beam may have similar conical beams, thereby focusing the power in a same area. As a result of the decreased dynamic range, an OAM receiver may uniformly receive different respective OAM beams because the different respective OAM beams may fall within a reception range of the OAM receiver. In some examples, a complexity of a receiver may decrease based on the decreased dynamic range of the OAM beams.

In the example of FIG. 6, the respective intensity distributions 600A, 600B, 600C, 600D, and 600E corresponding to different OAM orders may be generated from different antenna arrays of a number of concentric antenna arrays of an OAM antenna, such as the OAM antenna 500 described with reference to FIG. 5. In some examples, a first intensity distribution 600A and a fifth intensity distribution 600E may be generated from a first antenna array, such as the antenna array 502B described with reference to FIG. 5. In such examples, a second intensity distribution 600B and a fourth intensity distribution 600D may be generated from a second antenna array, such as the antenna array 502C described with reference to FIG. 5. Additionally, in such examples, a third intensity distribution 600C may be generated from a third antenna array, such as the antenna array 502D described with reference to FIG. 5.

In some examples, an OAM antenna, such as the OAM antenna 500 described with reference to FIG. 5, may be implemented in a fronthaul wireless communication device configured to communicate with a remote radio head (RRH). In some other examples, the OAM antenna may be used for point-to-point microwave links between base stations (for example, gNBs). In such examples, the OAM antenna may be specified for backhaul communication. In some other examples, the OAM antenna may be specified for sidelink communication.

Figure 7:
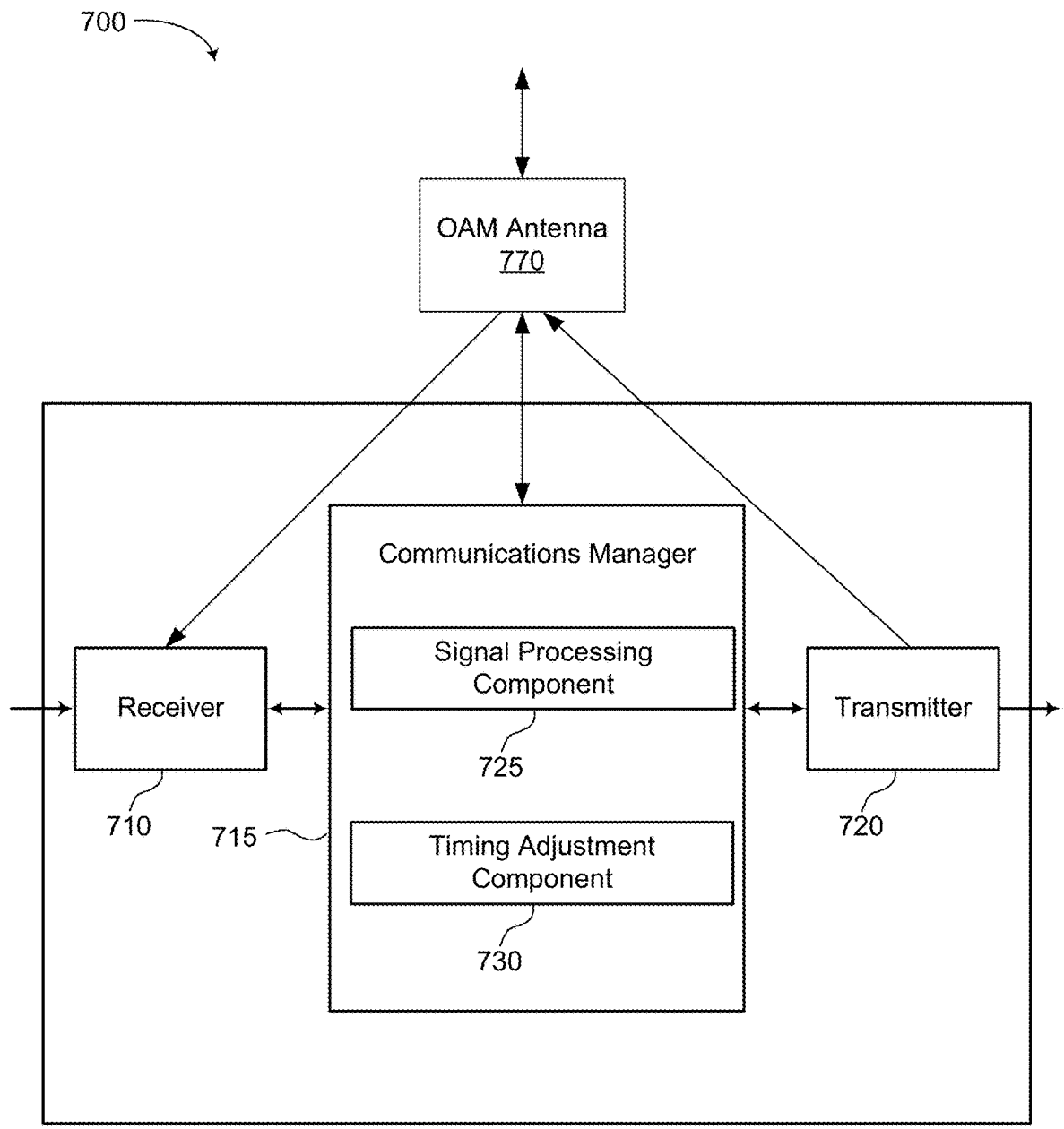
FIG. 7 is a block diagram of a wireless communication device that includes an OAM antenna configured to generate one or more OAM beams, in accordance with aspects of the present disclosure.

FIG. 7 shows a block diagram of a wireless communication device 700 that includes an OAM antenna 770 configured to generate one or more OAM beams, in accordance with aspects of the present disclosure. The wireless communication device 700 may be an example of aspects of a base station 17, described with reference to FIGS. 1 and 2. The wireless communication device 700 may include a receiver 710, a communications manager 715, and a transmitter 720, which may be in communication with one another (for example, via one or more buses). In some implementations, the receiver 710 and the transmitter 720 may operate in conjunction with the OAM antenna 770. In some examples, the wireless communication device 700 is configured to perform operations, including operations of the process 800 described below with reference to FIG. 8.

In some examples, the wireless communication device 700 can include a chip, system on chip (SoC), chipset, package, or device that includes at least one processor and at least one modem (for example, a 5G modem or other cellular modem). In some examples, the communications manager 715, or its sub-components, may be separate and distinct components. In some examples, at least some components of the communications manager 715 are implemented at least in part as software stored in a memory. For example, portions of one or more of the components of the communications manager 715 can be implemented as non-transitory code executable by the processor to perform the functions or operations of the respective component.

The receiver 710 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110, described with reference to FIGS. 1 and 2.

The received information may be passed on to other components of the wireless communication device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252a through 252r or the OAM antenna 404 or 500 described with reference to FIGS. 2, 4, and 5 respectively).

The transmitter 720 may transmit signals generated by the communications manager 715 or other components of the wireless communication device 700. In some examples, the transmitter 720 may be collocated with the receiver 710 in a transceiver. The transmitter 720 may be an example of aspects of the transmit processor 264 described with reference to FIG. 2. The transmitter 720 may be coupled with or otherwise utilize a set of antennas (for example, the set of antennas may be an example of aspects of the antennas 252a through 252r or the OAM antenna 404 or 500 described with reference to FIGS. 2, 4, and 5 respectively), which may be antenna elements shared with the receiver 710. In some examples, the transmitter 720 is configured to transmit control information in a physical uplink control channel (PUCCH) and data in a physical uplink shared channel (PUSCH).

The communications manager 715 may be an example of aspects of the controller/processor 280 described with reference to FIG. 2. The communications manager 715 includes a signal processing component 725 and a timing adjustment component 730. Working in conjunction with the transmitter 720, the signal processing component 725 is configured to generate a signal and provide the generate signal to one or more concentric antenna arrays of the OAM antenna 770. Working in conjunction with the transmitter 720, the timing adjustment component 730 is configured to control a timing of a set of antenna elements of each respective antenna array of the concentric antenna arrays of the OAM antenna 770. In some implementations, the timing adjustment component 730 may be a phase shifter.

Figure 8:
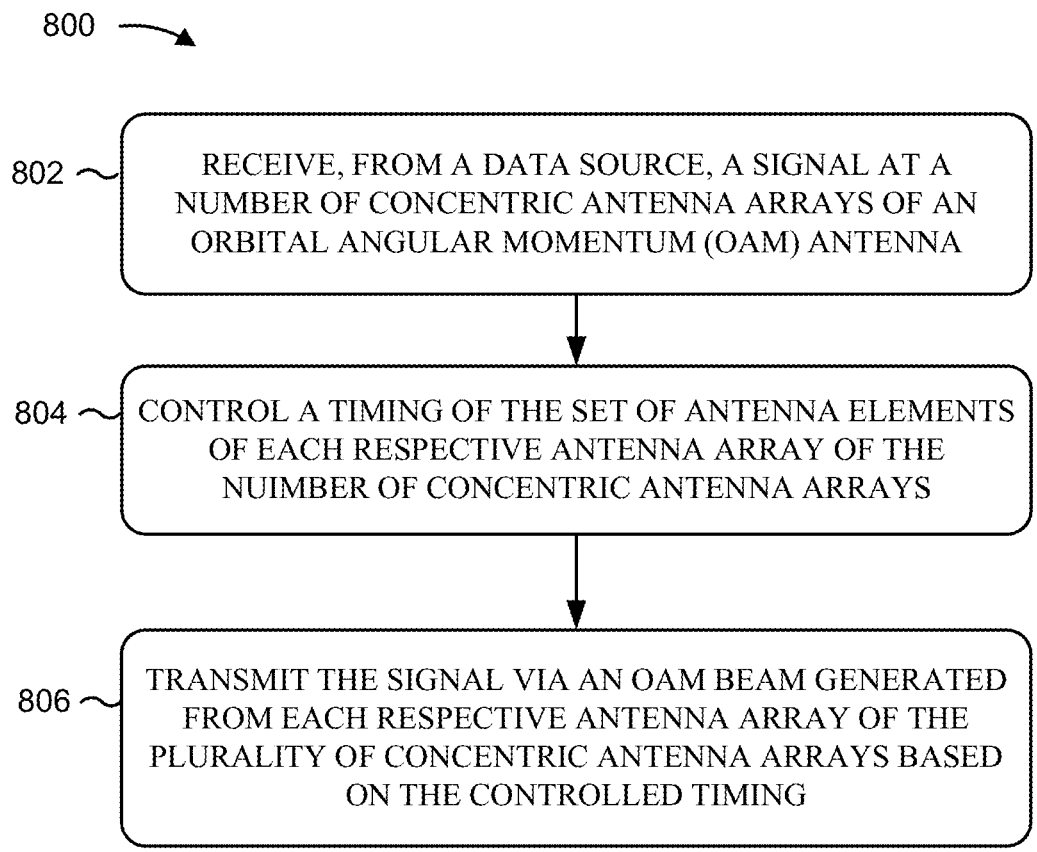
FIG. 8 is a diagram illustrating an example process performed, for example, with an OAM antenna, in accordance with various aspects of the present disclosure.

FIG. 8 is a diagram illustrating an example process 800 performed, for example, with an OAM antenna, in accordance with various aspects of the present disclosure. The example process 800 is an example of performing communications by an OAM antenna. In some implementations, process 800 may be performed by a an OAM antenna, such as the OAM antenna 142, 404, 500, or 770 described above with reference to FIGS. 1, 4, 5, and 7, respectively. The OAM antenna may be integrated with a wireless communication device, such as a base station 110 described above with reference to FIG. 1.

In some implementations, the process 900 begins in block 902 with receiving, from a data source, a signal at two or more concentric antenna arrays of the OAM antenna, each of the antenna arrays corresponding to a different OAM order and being comprised of a different respective set of antenna elements arranged at a different respective radius. In block 904, the process 900 controls a timing of the set of antenna elements of the different respective set of antenna elements. Additionally, in block 906, the process 900 transmits the signal via an OAM beam generated from each of the antenna arrays based on the controlled timing, each of the OAM beams generated from the concentric antenna arrays having a same divergence angle.

The following provides an overview of some Aspects of the present disclosure:

Aspect 1: An orbital angular momentum (OAM) antenna, comprising: a plurality of concentric antenna arrays, each of the antenna arrays corresponding to a different OAM order and being comprised of a different respective set of antenna elements arranged at a different respective radius; and a plurality of phase shifters, each of the phase shifters corresponding to a different respective antenna array of the plurality of concentric antenna arrays and configured to trigger the respective set of antenna elements of the corresponding antenna array to generate a respective OAM beam, each of the OAM beams generated from the concentric antenna arrays having a same divergence angle Aspect 2: The OAM antenna of Aspect 1, wherein each of the antenna arrays is a phased antenna array.

Aspect 3: The OAM antenna of any one of Aspects 1 to 2, wherein each of the phase shifters is hard wired.

Aspect 4: The OAM antenna of any one of Aspects 1 to 3, wherein the divergence angle of each respective OAM beam is based on the radius of the respective set of antenna elements of the antenna array generating the respective OAM beam, the OAM order corresponding to the antenna array, and a wavelength of the respective OAM beam.

Aspect 5: The OAM antenna of Aspect 4, wherein the OAM order defines a number of times a phase of the respective OAM beam rotates around a central axis.

Aspect 6: The OAM antenna of any one of Aspects 1 to 5, wherein a number of elements in each respective set of antenna elements is based on the OAM order of a corresponding antenna array.

Aspect 7: The OAM antenna of Aspect 6, wherein the number of elements is greater than twice an absolute value of the OAM order.

Aspect 8: The OAM antenna of any one of Aspects 1 to 7, wherein each of the antenna arrays is a uniform circular array.

Aspect 9: A network device comprising: an orbital angular momentum (OAM) antenna comprising: a plurality of concentric antenna arrays, each of the antenna arrays corresponding to a different OAM order and being comprised of a different respective set of antenna elements arranged at a different respective radius; and a plurality of phase shifters, each of the phase shifters corresponding to a different respective antenna array of the plurality of concentric antenna arrays and configured to trigger the respective set of antenna elements of the corresponding antenna array to generate a respective OAM beam, each of the OAM beams generated from the concentric antenna arrays having a same divergence angle; a processor; and a memory communicatively coupled with the processor and storing instructions that, when executed by the processor, cause the network device to transmit a signal via the OAM beams.

Aspect 10: The network device of Aspect 9, wherein each of the antenna arrays is a phased antenna array.

Aspect 11: The network device of any one of Aspects 9 to 10, wherein each of the phase shifters is hard wired.

Aspect 12. The network device of any one of Aspects 9 to 11, wherein the divergence angle of each respective OAM beam is based on the radius of the respective set of antenna elements of the antenna array generating the respective OAM beam, the OAM order corresponding to the antenna array, and a wavelength of the respective OAM beam.

Aspect 13: The network device of Aspect 12, wherein the OAM order defines a number of times a phase of the respective OAM beam rotates around a central axis.

Aspect 14: The network device of any one of Aspects 9 to 13, wherein a number of elements in the set of antenna elements of each respective antenna array is based on the OAM order corresponding to the respective antenna array.

Aspect 15: The network device of Aspect 14, wherein the number of elements is greater than twice an absolute value of the OAM order.

Aspect 16: The network device of any one of Aspects 9 to 16, wherein each of the antenna arrays is a uniform circular array.

Aspect 17: The network device of any one of Aspects 9 to 16, wherein the signal transmits information for a peer-to-peer backhaul transmission.

Aspect 18: The network device of any one of Aspects 9 to 17, wherein the signal transmits information for a peer-to-peer fronthaul transmission.

Aspect 19: A method for wireless communication performed by an orbital angular momentum (OAM) antenna, comprising: receiving, from a data source, a signal at a plurality of concentric antenna arrays of the OAM antenna, each of the antenna arrays corresponding to a different OAM order and being comprised of a different respective set of antenna elements arranged at a different respective radius; controlling a timing of the different respective set of antenna elements; and transmitting the signal via an OAM beam generated from each of the antenna arrays based on the controlled timing, each of the OAM beams generated from the concentric antenna arrays having a same divergence angle.

Aspect 20: The method of Aspect 19, wherein the timing is controlled by a plurality of phase shifters, each of the phase shifters corresponding to a different respective antenna array of the plurality of concentric antenna arrays.

Aspect 21: The method of any one of Aspects 19 to 20, further comprising determining the divergence angle of each respective OAM beam based on the radius of respective set of antenna elements of the antenna array generating the respective OAM beam, the OAM order corresponding to the antenna array, and a wavelength of the respective OAM beam.

Aspect 22: The method of any one of Aspects 19 to 21, wherein a number of elements in the set of antenna elements of each respective antenna array is based on the OAM order of a corresponding antenna array.

Aspect 23. The method of any one of Aspects 19 to 22, wherein the signal transmits information for a peer-to-peer backhaul transmission.

Aspect 24. The method of any one of Aspects 19 to 23, wherein the signal transmits information for a peer-to-peer fronthaul transmission.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An orbital angular momentum (OAM) antenna, comprising:
   a plurality of concentric antenna arrays, each of the antenna arrays corresponding to a different OAM order and being comprised of a different respective set of antenna elements arranged at a different respective radius, a number of elements in the set of antenna elements of each respective antenna array being different and being based on a value of the respective OAM order of the antenna array; and
   a plurality of phase shifters, each of the phase shifters corresponding to a different respective antenna array of the plurality of concentric antenna arrays and configured to trigger the respective set of antenna elements of the corresponding antenna array to generate a respective OAM beam, each of the OAM beams generated from the concentric antenna arrays having a same divergence angle.

2. The OAM antenna of claim 1, wherein each of the antenna arrays is a phased antenna array.

3. The OAM antenna of claim 1, wherein each of the phase shifters is hard wired.

4. The OAM antenna of claim 1, wherein the divergence angle of each respective OAM beam is based on the radius of the respective set of antenna elements of the antenna array generating the respective OAM beam, the OAM order corresponding to the antenna array, and a wavelength of the respective OAM beam.

5. The OAM antenna of claim 4, wherein the OAM order defines a number of times a phase of the respective OAM beam rotates around a central axis.

6. The OAM antenna of claim 1, wherein the number of elements is greater than twice an absolute value of the OAM order.

7. The OAM antenna of claim 1, wherein each of the antenna arrays is a uniform circular array.

8. A network device comprising:
   an orbital angular momentum (OAM) antenna comprising:
     a plurality of concentric antenna arrays, each of the antenna arrays corresponding to a different OAM order and being comprised of a different respective set of antenna elements arranged at a different respective radius, a number of elements in the set of antenna elements of each respective antenna array being different and being based on a value of the respective OAM order of the antenna array; and
     a plurality of phase shifters, each of the phase shifters corresponding to a different respective antenna array of the plurality of concentric antenna arrays and configured to trigger the respective set of antenna elements of the corresponding antenna array to generate a respective OAM beam, each of the OAM beams generated from the concentric antenna arrays having a same divergence angle;

a processor; and a memory communicatively coupled with the processor and storing instructions that, when executed by the processor, cause the network device to transmit a signal via the OAM beams.

9. The network device of claim 8, wherein each of the antenna arrays is a phased antenna array.

10. The network device of claim 8, wherein each of the phase shifters is hard wired.

11. The network device of claim 8, wherein the divergence angle of each respective OAM beam is based on the radius of the respective set of antenna elements of the antenna array generating the respective OAM beam, the OAM order corresponding to the antenna array, and a wavelength of the respective OAM beam.

12. The network device of claim 11, wherein the OAM order defines a number of times a phase of the respective OAM beam rotates around a central axis.

13. The network device of claim 8, wherein the number of elements is greater than twice an absolute value of the OAM order.

14. The network device of claim 8, wherein each of the antenna arrays is a uniform circular array.

15. The network device of claim 8, wherein the signal transmits information for a peer-to-peer backhaul transmission.

16. The network device of claim 8, wherein the signal transmits information for a peer-to-peer fronthaul transmission.

17. A method for wireless communication performed by an orbital angular momentum (OAM) antenna, comprising:

receiving, from a data source, a signal at a plurality of concentric antenna arrays of the OAM antenna, each of the antenna arrays corresponding to a different OAM order and being comprised of a different respective set of antenna elements arranged at a different respective radius, a number of elements in the set of antenna elements of each respective antenna array being different and being based on a value of the respective OAM order of the antenna array;

controlling a timing of the different respective set of antenna elements; and transmitting the signal via an OAM beam generated from each of the antenna arrays based on the controlled timing, each of the OAM beams generated from the concentric antenna arrays having a same divergence angle.

18. The method of claim 17, wherein the timing is controlled by a plurality of phase shifters, each of the phase shifters corresponding to a different respective antenna array of the plurality of concentric antenna arrays.

19. The method of claim 17, further comprising determining the divergence angle of each respective OAM beam based on the radius of respective set of antenna elements of the antenna array generating the respective OAM beam, the OAM order corresponding to the antenna array, and a wavelength of the respective OAM beam.

20. The method of claim 17, wherein the signal transmits information for a peer-to-peer backhaul transmission.

21. The method of claim 17, wherein the signal transmits information for a peer-to-peer fronthaul transmission.

* * * * *